---

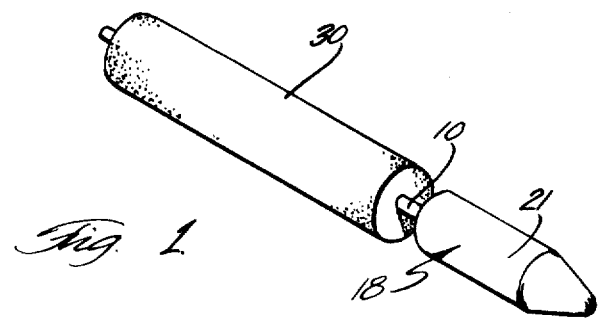
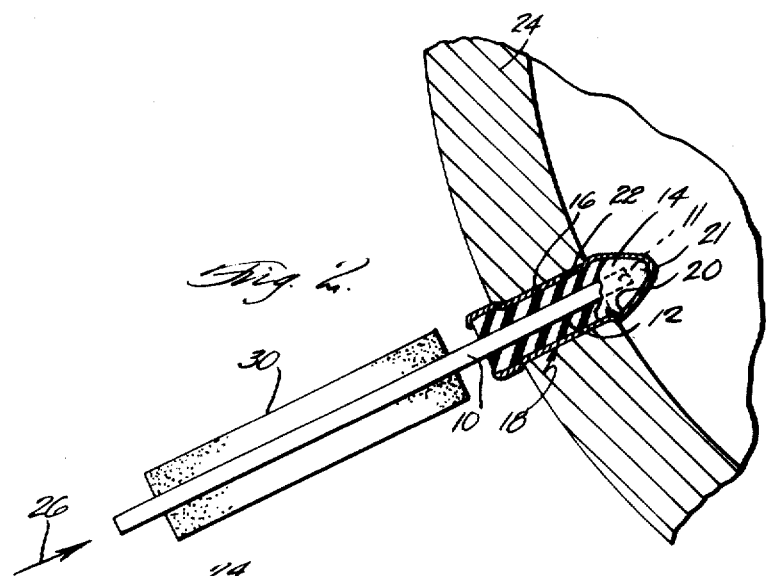
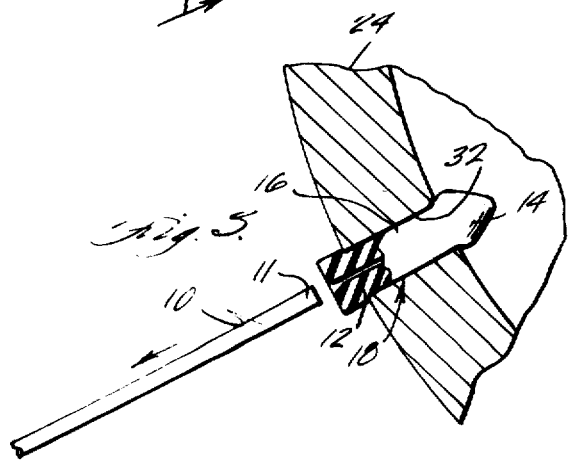
BOND OF VULCANIZED
PARAFFIN-RUBBER
MIXTURE
INVENTOR.
WILLIAM B. HOPKINS
BY
Victor J. Evans & Co.
ATTORNEYS

United States Patent Office 3,542,614
Patented Nov. 24, 1970

3,542,614
DEVICE FOR THE REPAIR OF PUNCTURES IN TUBELESS TIRES
William B. Hopkins, 600 Park Ave.,
Muscatine, Iowa 52761
Filed Apr. 11, 1968, Ser. No. 720,716
Int. Cl. B29n 5/16; B60c 21/06, 25/16
U.S. Cl. 156—97
2 Claims

ABSTRACT OF THE DISCLOSURE

A device for repairing punctured tubeless tires in which there is a bar or rod member having a tough, cured rubber wedge portion disposed on one end thereof, a coating of uncured vulcanizable rubber compound over the said wedge, a coating of paraffin rubbed on to said vulcanizable rubber compound at the time the device is used to act as a lubricant and later to serve as a cleaning agent when melted and as a rubber softening agent when absorbed into the rubber compound coating, and an electric heating element or fuel mass disposed on the remaining portion of said bar or rod to be used to heat the rod for causing the cured rubber wedge to soften slightly and assume the shape of the puncture and for securing the wedge into the punctured tubeless tire by vulcanization of the coating.

---

The present invention relates to a means for the repair of punctures in tubeless tires, and more particularly relates to a tough, cured rubber construction formed as a wedge having a vulcanizable rubber coating thereon. A coating of paraffin is rubbed on just before use, said paraffin acting as a lubricant which engages the puncture for easing the rubber wedge into the puncture, and which paraffin later serves as a cleaning agent when melted and it then is absorbed into the vulcanizable rubber coating as the coating proceeds to vulcanize. An electric heating element, or a fuel mass, is disposed on an end of the bar or rod on which the rubber wedge is disposed at the opposite end thereof, and thus forms the inventive device for repairing tubeless tires without demounting from the rim.

An object of the present invention is to provide a new and improved means for repairing punctures in tubeless tires.

The above and other objects and advantages of the invention will become apparent upon full consideration of the following detailed description and accompanying drawings in which:

FIG. 1 is a perspective view of the device for repairing punctures in accordance with the preferred embodiment of the invention;

FIG. 2 is a cross-sectional view of the device being applied to a puncture in a tubeless tire; and FIG. 3 is a cross-sectional view showing the manner in which the device of the invention is terminably disposed within the puncture of said tubeless tire.

Referring now to the drawings, there is shown a rod or bar 10 having on its forward end 11 a tough, cured rubber material 12 having a tapered portion 14, a cylindrical portion 16, and all forming generally a wedge 18. The wedge 18 is affixed onto the forward end of the rod 10, and there is disposed throughout the outer surface of the wedge 18 an uncured vulcanizable rubber coating 20. A coating of paraffin 21 is rubbed on coating 20 just before the wedge is inserted into a puncture 22. The paraffin coating is seen to act as a lubricant when the wedge is inserted into puncture 22 of a tubeless type tire 24. The device is driven in by applying force in the direction of arrow 26, as shown in FIG. 2.

On the other end of the rod 10, there is mounted and secured a coil of heating wire or fuel mass 30 which incinerates when it is lighted as is well known in the art, so that the wedge 18 becomes affixed and secured to the tire 24 by vulcanization. During the heating step, the paraffin coating 21 that remains on the vulcanizable rubber coating 20 becomes melted and cleans the rubber surface of the puncture wall just before it is absorbed into the vulcanizable rubber coating. The heat next causes the paraffin-rubber coating mixture to vulcanize so uniting the wedge 18 to the tire 24.

FIG. 3 shows the coiled heating wire or the fuel mass 30 having become incinerated and remains on the left end of the rod as it is withdrawn from the wedge 18.

The invention is seen to comprise the construction, assembly and use of parts that are not known in the prior art and in which the advantages, objects and improvements of the invention are attained.

Thus, it is seen a coating of paraffin is rubbed on the rubber coating just before the repair device is used to repair a puncture. It serves as the lubricant enabling the wedge to be inserted into the puncture. The paraffin cannot be put on in advance as it is absorbed into the uncured rubber coating with the passage of time at room temperature.

One, therefore, must understand that the bonding process involves the cured ruber wedge, the uncured heat vulcanizable rubber coaitng on the wedge, the paraffin coating rubbed on the rubber coating and the tire. When the device has been inserted into the puncture with the aid of the paraffin as lubricant, the rod is heated and the cured rubber wedge therefore is heated. The wedge softens slightly and is molded to the shape of the puncture. As soon as the wedge is cool, it is no longer in the extra soft condition and regains the usual rubber properties. It will have acquired the shape of the puncture and this is important as it assures a good fit. The paraffin on the rubber coating melts and cleans the rubber in the puncture area so it can receive the bonding action to follow. The paraffin is next absorbed into the rubber coating and completely disappears in its role as lubricant and cleaning agent and now becomes a rubber softening agent to the vulcanizable rubber coating. The rubber coating and absorbed paraffin mixture next vulcanizes and in so doing unites the wedge to the tire.

Additional embodiments of the invention in this specification will occur to others and, therefore, it is intended that the scope of the invention be limited only by the appended claims and not by the embodiment described hereinabove. Accordingly, reference should be made to the following claims in determining the full scope of the invention.

What is claimed is:

1. A device for the repair of punctures in tubeless tires and other rubber stuctures comprising an elongated rod member, a wedge of tough, cured rubber having a conical taper at the front thereof and a rear cylindrical portion and encompassing one of the ends of the rod member, an uncured vulcanizable rubber coating on the wedge, a paraffin coating on the rubber coating serving as a lubricant to supplement the conical taper in facilitating manual insertion only of the wedge into a puncture, the wedge having a middle cylindrical portion of smaller diameter than the base of the conical taper and the rear cylindrical portion for automatically locking the middle cylindrical portion within the puncture upon insertion, and a source of heat connected to the rod member, the rod member transmitting the heat to the cured rubber wedge causing it to take on the shape of the puncture and causing the paraffin to melt and serve as a cleaning agent, the paraffin to be absorbed as a rubber softening agent into the uncured vulcanizable rubber coating, and vulcanization of the paraffin-rubber mixture formed thereby uniting the wedge to the tire.

2. A device for the repair of punctures in tubeless tires and other rubber structures comprising an elongated rod member, a wedge of tough, cured rubber having a conical taper at the front thereof and a rear cylindrical portion and encompassing one of the ends of the rod member, an uncured vulcanizable rubber coating on the wedge, a paraffin coating on the rubber coating serving as a lubricant to supplement the conical taper in facilitating manual insertion only of the wedge into a puncture, and a source of heat connected to the rod member, the rod member transmitting the heat to the cured rubber wedge causing it to take on the shape of the puncture and causing the paraffin to melt and serve as a cleaning agent, the paraffin to be absorbed as a rubber softening agent into the uncured vulcanizable rubber coating, and vulcanization of the paraffin-rubber mixture formed thereby uniting the wedge to the tire.

References Cited
UNITED STATES PATENTS 2,991,819   7/1961   Lee.

THERON E. CONDON, Primary Examiner

R. V. PARKER, JR., Assistant Examiner

U.S. Cl. X.R.

81—15.7; 152—370